United States Patent

[11] 3,582,210

| [72] | Inventor | Jack D. Jones |
| | | 11508 N. Victoria, Oklahoma City, Okla. 73120 |
| [21] | Appl. No. | 782,640 |
| [22] | Filed | Dec. 10, 1968 |
| [45] | Patented | June 1, 1971 |

[54] ILLUMINATION PLOTTER MOUNTED ON A MOBILE VEHICLE
10 Claims, 8 Drawing Figs.

[52] U.S. Cl............................................. 356/72,
250/202, 356/121, 356/218, 356/222
[51] Int. Cl.................................................. G01n, 21/00
G01j i/00, G01j 1/117
[50] Field of Search.......................................... 250/202;
356/22, 222—226, 215, 121, 218; 350/302, 307;
343/701, 842, 843

[56] References Cited
UNITED STATES PATENTS

| 702,329 | 6/1902 | Poliakoff.................... | 356/222X |
| 1,372,606 | 3/1921 | Davidson..................... | 350/302 |
| 1,798,119 | 3/1931 | Clifton ....................... | 356/222X |
| 2,317,652 | 4/1943 | Toney ........................ | 177/311 |
| 2,712,912 | 7/1955 | Hattan......................... | 250/221UX |
| 3,201,750 | 8/1965 | Morin.......................... | 250/202X |
| 3,426,146 | 2/1969 | Seaman....................... | 356/72X |
| 3,441,835 | 4/1969 | Hekrdle....................... | 356/222X |

*Primary Examiner*—Ronald L. Wilbert
*Assistant Examiner*—Warren A. Sklar
*Attorney*—Dunlap, Laney, Hessin & Dougherty ABSTRACT: An illumination plotter for plotting illumination characteristics of thoroughfare lighting systems including a vehicle, an adjustable length, horizontally extending, supporting bar mounted on the top of said vehicle, and a pair of light intensity sensing devices mounted on opposite ends of the supporting bar. The sensing devices are connected to an amplifier carried in the vehicle, and the amplifier is connected to a recording system. The sensing devices each have convex, upwardly facing light-sensitive surfaces to obtain maximum exposure to light emanating from above.

PATENTED JUN 1 1971 3,582,210
SHEET 1 OF 2
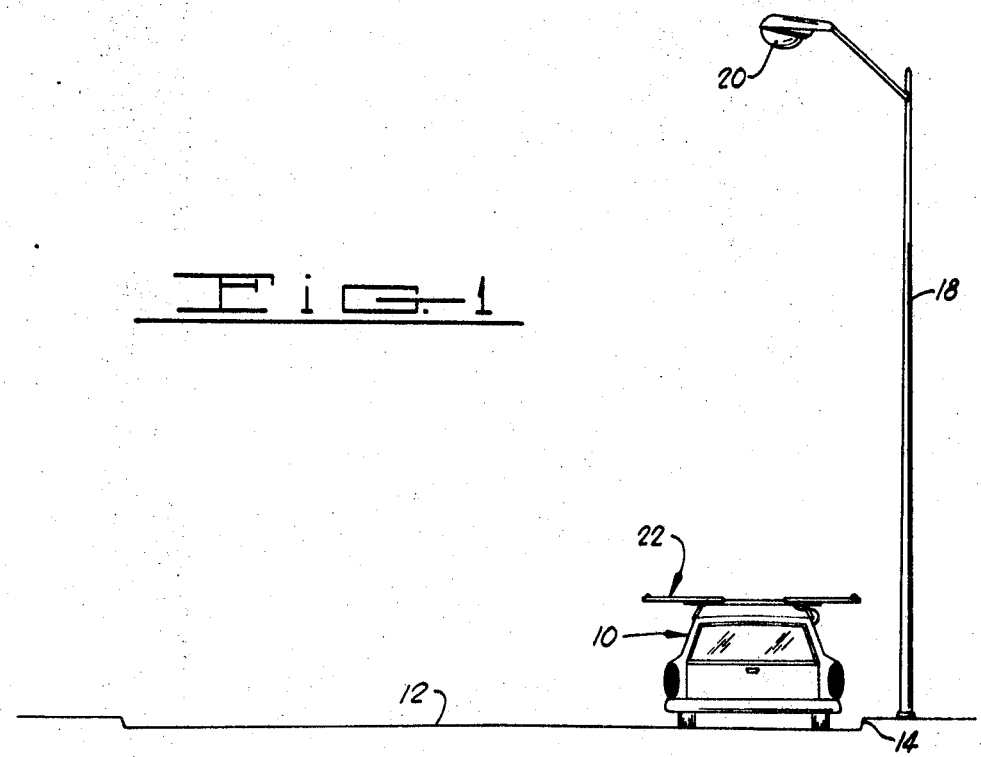
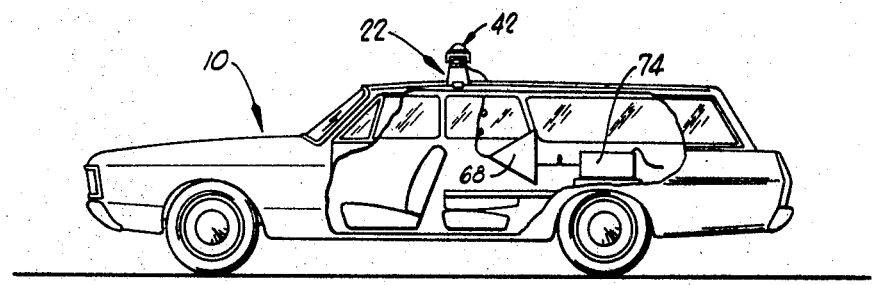
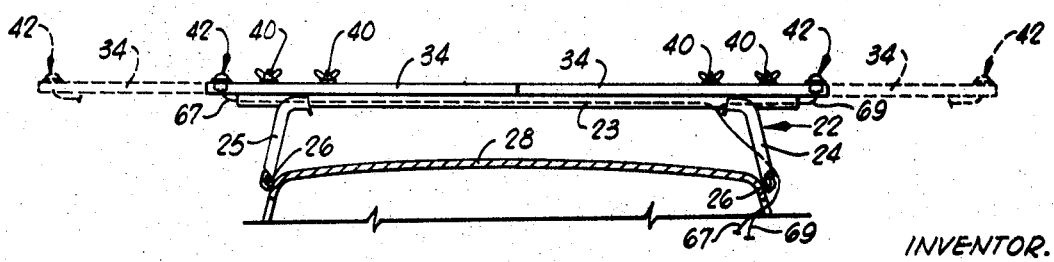
INVENTOR.
JACK D. JONES
BY
Dawley Jany Nessin & Dougherty
ATTORNEYS

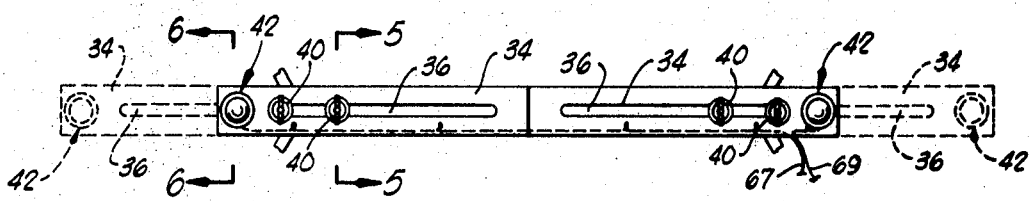
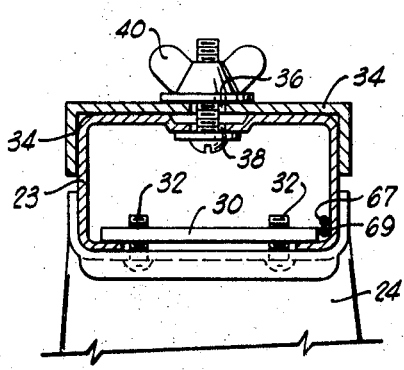
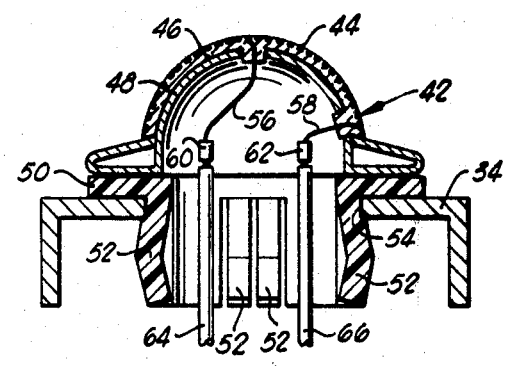
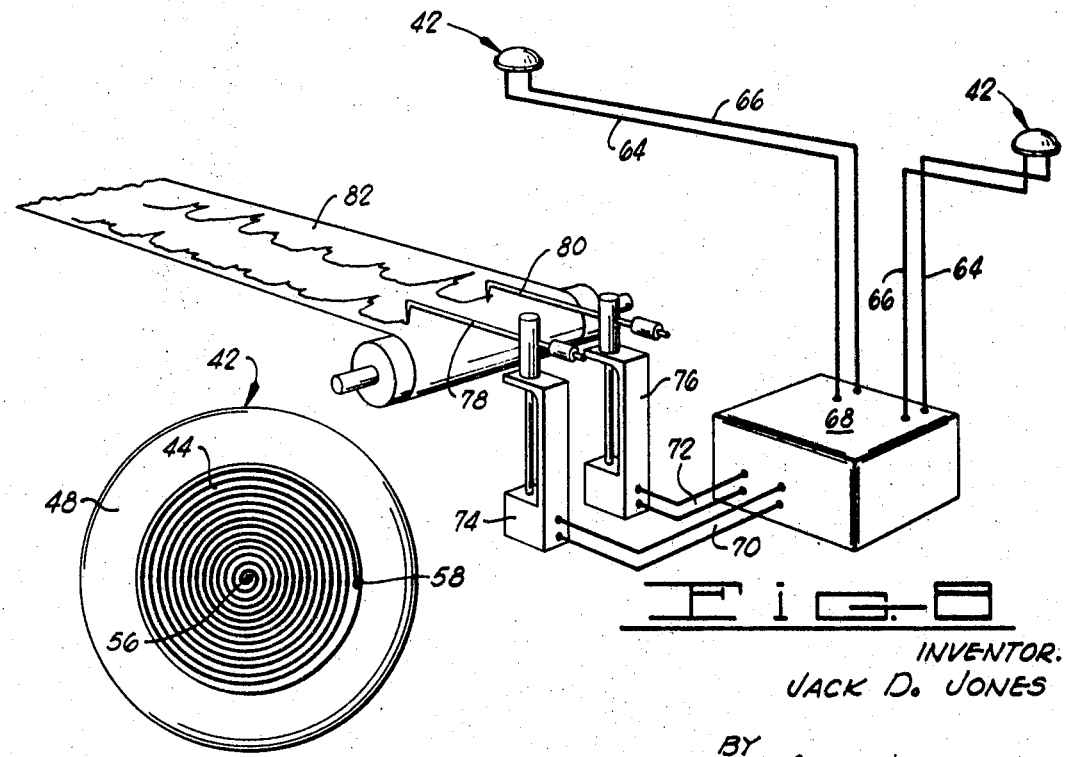
INVENTOR.
JACK D. JONES

ILLUMINATION PLOTTER MOUNTED ON A MOBILE VEHICLE

BACKGROUND OF THE INVENTION

1. Field of the Invention

This invention relates to the field of illumination engineering, and more specifically, to apparatus useful for ascertaining the level or intensity of illumination along a street or highway at night.

2. Brief Description of the Need for the Invention

In modern thoroughfare design, construction and maintenance, the provision of adequate lighting is an important consideration, since the safety of both vehicles and pedestrians is directly related to this portion of the system. In present designs in which complex mercury vapor luminaires are often used as the source of illumination, the luminaires are most often located near the side of, and relatively high above, the roadway. In order to provide data for designers of new thoroughfare illumination systems, and perhaps more importantly, for the purpose of periodically checking the performance and sufficiency of existing systems to permit their maintenance or replacement, it is desirable to provide a means for determining the levels of light intensity existent at all points along the entire length of the thoroughfare.

BRIEF DESCRIPTION OF THE INVENTION

The present invention provides an efficient, easily used apparatus for providing data on the performance of thoroughfare illumination systems. Broadly described, the invention is an illumination plotter which comprises a mobile vehicle adapted to move along the thoroughfare, adjustable supporting means mounted on the vehicle for supporting a plurality of light-sensing devices, and a plurality of spaced light-sensing devices mounted on said supporting means and movable therewith to preselected positions relative to said vehicle. Signal-amplifying means is mounted on the vehicle and connected to the light-sensing devices for receiving signals therefrom. A recording system is mounted on the vehicle and connected to the amplifying means for receiving amplified signals therefrom for visual recordation.

In a preferred embodiment of the invention, a pair of light-sensitive photoresistor devices are utilized and the light-responsive upper surface of each of the devices is convex to facilitate maximum response to incident light. A two-channel amplifier is utilized, and the outputs therefrom are used to operate a two-pen strip chart recorder.

A major object of the invention is to provide apparatus for plotting the levels of illumination along a thoroughfare in an accurate and expeditious manner.

An additional object of the invention is to provide an illumination plotter for evaluating a thoroughfare illumination system, which plotter can be adjusted to permit selected zones of illumination to be plotted.

Another object of the invention is to provide a mobile illumination plotter which is simply constructed and permits substantially instantaneous detection of the intensity of artificial light at locations along lighted thoroughfares.

Additional objects and advantages of the invention will become apparent as the following detailed description is read in conjunction with the accompanying drawings which illustrate the invention.

BRIEF DESCRIPTION OF THE DRAWINGS

FIG. 1 is a view in elevation illustrating the illumination plotter device of the invention being used for plotting the illumination along a thoroughfare.

FIG. 2 is a side elevation view of the illumination plotter device of the invention with parts broken away to show a portion of the apparatus located inside a vehicle.

FIG. 3 is a view partly in section and partly in elevation illustrating the detecting portion of the illumination plotter device of the invention. Dashed lines are employed to illustrate the position occupied by certain portions of the apparatus during certain uses thereof.

FIG. 4 is a plan view of the supporting structure used to support the illumination sensing devices of the invention in an exposed location.

FIG. 5 is a sectional view taken along line 5-5 of FIG. 4.

FIG. 6 is a sectional view taken along line 6-6 of FIG. 4.

FIG. 7 is a plan view of one of the illumination sensing devices used in the illumination plotter of the invention.

FIG. 8 is a schematic perspective view of the electrical and readout portion of the apparatus of the invention.

DETAILED DESCRIPTION OF A PREFERRED EMBODIMENT OF THE INVENTION

Referring initially to FIG. 1 of the drawings, there is there illustrated an automotive vehicle 10 which is depicted as moving along a thoroughfare 12 adjacent one curb 14 thereof. Extending upwardly from the ground adjacent the thoroughfare 12 is a light pole 18 carrying at its upper end a mercury vapor luminaire 20 or other suitable source of illumination for lighting the thoroughfare.

Positioned atop the automotive vehicle 10 is a supporting structure designated generally by reference numeral 22. The supporting structure 22 includes an elongated, hollow top carrier 23 and a pair of legs 24 and 25 which are adapted to have their ends clamped to the rain gutters or rails 26 along the sides of the top 28 of the automotive vehicle 10 (see FIG. 3). The legs 24 and 25 each have a substantially horizontally extending upper portion of channel or C-shaped cross-sectional configuration as shown in FIG. 5, and the legs receive the opposite end portions of the hollow top carrier 23. The top carrier 23 is slotted at the bottom along the length thereof to permit a retainer plate 30 to be movably positioned on the hollow interior thereof. Retainer screws 32 are extended through the upper portions of the legs 24 and 25 and through the retainer plate 30 to permit the elongated hollow top carrier 23 to be clamped to the legs. This arrangement permits the length of the supporting structure 22 to be adjusted so that it can be secured across the top of substantially any automobile.

Slidably mounted on the top carrier 23 in end-to-end relation are a pair of elongated channel extension bars 34. The channel extension bars 34 are each provided with elongated slots 36 which are located above and in alignment with elongated slots 38 formed in the top carrier 23. Extended through the slots 36 and 38 are wing nuts 40 which permit adjustment of each of the channel extension bars 34 on the top carrier 23. Thus, by loosening the wing nuts 40 and sliding the channel extension bars 34 outwardly (in a transverse direction with respect to the automotive vehicle 10), the channel extension bars can be moved to the positions illustrated in dashed lines in FIGS. 3 and 4. The purpose of such adjustment of the channel extension bars 34 will be hereinafter explained in greater detail.

Mounted near the outer end of each of the channel extension bars 34 is a light- or illumination-sensing device designated generally by reference numeral 42. In a preferred embodiment of the invention, each of the light-sensing devices is a light-sensitive photoresistor which has its light-sensitive surface made of cadmium sulfide. The light-sensitive surface of each of the light-sensitive devices 42 is shown in detail in FIG. 6, and is designated by reference numeral 44. As shown in FIG. 6, the photoresistor devices used in a preferred embodiment of the invention are specially constructed to have a hemispherically shaped, convex upper surface carrying the light-sensitive cadmium sulfide material. As is well understood in the art, this material undergoes a change in its electrical resistance in direct proportion to the amount of light which impinges thereon.

The cadmium sulfide material 44 is bonded to a ceramic base 46, also of hemispherical configuration, and a suitable protective seal 48 is disposed inside of and supports the ceramic base 46. The protective seal 48 is bonded to a molded plastic plug 50 which carries suitable spring retainer elements 52 which can be biased inwardly in resilient deformation to permit each light-sensing device 42 to be pressed through an aperture 54 formed in the upper side of the respective channel extension bar 34 in which it is mounted. This construction permits quick and easy installation or removal and replacement of each of the light-sensitive devices 42. The appearance of the light-sensitive devices 42 as they appear in plan view is illustrated in FIG. 7.

Extending through the protective seal 48 at the uppermost central portion of each of the hemispherically shaped light-sensitive elements 42 is an electrical conductor 56 which is electrically connected to the cadmium sulfide material 44. A second electrical conductor 58 is extended through the protective seal 48 into contact with the lower peripheral edge of the cadmium sulfide as shown in FIG. 6. Preferably, the electrical conductors 56 and 58 are copper electrodes which are connected at their inner ends to socket members 60 and 62 to which suitable flexible electrical leads 64 and 66 can be connected and disconnected when the light-sensitive devices 42 are connected or disconnected from the respective channel extension bars 34 in which they are mounted.

As shown in FIGS. 3—5, the paired electrical leads 67 and 69 are extended through the length of the inside of the top carrier 23 and out the open end of the top carrier at one end thereof, thence through a window or other suitable opening in the automotive vehicle 10. The paired leads 67 and 69 from the two light-sensitive devices 42 are then connected to a signal-amplifying device 68 which, in a preferred embodiment of the invention, is a double channel amplifier of any suitable type well known in the electronics field. The channels of the amplifier 68 are connected by suitable leads 70 and 72 to a pair of pen motors 74 and 76 which drive the styluses or pens 78 and 80 in response to electrical signals received at the pen motors from the amplifier 68. The pens 78 and 80 scribe significant indicia representative of the signal output of the amplifier 68 upon a continuous chart 82. The output of the amplifier 68 is in turn responsive to signals received from the light-sensitive devices 42.

OPERATION

In the use of the illumination plotter of the invention, the automotive vehicle 10 is driven down a thoroughfare along which it is desired to evaluate the adequacy or characteristics of the illumination provided. The automotive vehicle 10 is initially driven along the curb or relatively close to the curb and the electrical circuitry which includes the amplifier 68, the light-sensitive devices 42 and the pen motors 74 and 76 is energized. As the vehicle moves along the thoroughfare, light emanating from sources such as the mercury vapor luminaire 20 depicted in FIG. 1 impinges upon the light-sensitive devices 42, and the impingement of light on these devices causes a change in the resistance of the cadmium sulfide material 44 to occur. This, in turn, changes the resistance characteristic of the electrical circuit in which each photoresistor is located, so that a signal which is directly proportional to the amount of light impinging upon the photoresistor is developed. The spectral response of the light-sensitive devices 42 is made to closely approximate that of the human eye. It will be noted that the horizontal positioning of the photoresistors or light-sensitive devices 42 can be adjusted by sliding the adjustable channel extension bars 34 along the top carrier 23 to space the light-sensitive devices 42 further from, or closer to, each other as the particular width or geometric characteristics of a given thoroughfare may dictate.

It is important to note that the hemispherical configuration of the photoresistor light-sensitive surface which is constituted by the cadmium sulfide material 44 permits the light-sensitive devices to be more responsive to light which may be incident upon the device from substantially any direction above or to one side of the device. Of course, any change in quantity of the impinging light resulting from shadows, or any object interfering with the transmission of the light rays from the mercury vapor luminaire 20 to the thoroughfare, will result in a change in the photoresistors' electrical resistance and will change the output from the amplifier 68. The dual signals which are developed by the two-channel amplifier 68 as a result of its response to signals originating at the two light-sensitive devices 42 are directed to the pen motors 74 and 76 which respond by imparting motions to the pens 78 and 80. Each of the pens 78 and 80 corresponds to one of the light-sensitive devices 42, and effectively scribes a trace on the continuous chart 82. The traces indicate by peaks and depressions, the locations along the street at which zones of greater or lesser light intensity occur. In other words, the rate of travel of the continuous chart 82 is correlated to the rate of travel of the automotive vehicle 10 along the street, and the chart may accordingly be graduated in terms of a particular position along the street corresponding to a position on the chart. Thus, the peaks and the curves which are scribed by the pens 78 and 80 can be interpreted to permit analysis of the illumination pattern along the thoroughfare.

The illumination recording should be taken late at night, preferably after the night traffic has diminished, so that anomalies and errors in the true light intensity readings developed by the apparatus are not produced by spurious light from automobile headlights or the like. While the recordings are being taken, the automotive vehicle 10 should be traveling in a straight line and at a relatively uniform rate of speed of approximately 20 miles per hour. The complete roadway or thoroughfare can be profiled by charting the outside lane, then coming back and charting the next lane toward the center of the thoroughfare and so forth until the entire thoroughfare has been covered. The charts can be further marked manually or in any other suitable way to indicate the location on the chart which corresponds to a point of alignment of the automotive vehicle with one of the lamp posts 18 and its corresponding mercury vapor luminaire.

After the charts have been obtained, they can be used to evaluate the initial performance of a newly installed thoroughfare lighting system. They can also be employed for the purpose of recording the depreciation of the light system over a given period of time, thereby establishing a predictable depreciation rate for fixture and locality. Moreover, the information obtained with the illumination-plotting apparatus of the invention can also be utilized to accurately compare the performances of the mercury vapor luminaires of different manufacturers after installation to assist in future purchasing decisions. The performance of each of the luminaires in a system can be evaluated for lumen output and effectiveness of light pattern, and the system as a whole can be checked for comparison with the engineered design and installation. Information derived from the apparatus can also be used for more effectively scheduling cleaning periods for cleaning the globes or transparent covers of the lamps.

From the foregoing description of the invention, it will be seen that the present invention provides an effective and highly useful method for plotting illumination characteristics, particularly the characteristics of a lighting system used for night lighting of thoroughfares. The system can be easily constructed, and the vehicle which forms a part of the system can be used either as a part of the system, or portions of the system dismantled therefrom to permit other uses of the vehicle. The equipment employed in the system is relatively economical, and the construction and maintenance of the illumination plotter system is relatively inexpensive.

What I claim is:
1. An illumination plotter apparatus comprising:
   a mobile vehicle;
   supporting means mounted on the upper portion of said vehicle;
   a plurality of light-sensing devices mounted on said supporting means in horizontally spaced relation to each other;
   each of said light-sensing devices comprising a hemispherical, upwardly facing exposed surface of light-sensitive material; and
   signal-responsive means mounted on the vehicle and responsive to signals developed by said light-sensing devices.

2. An illumination plotter apparatus as defined in claim 1 wherein said supporting means includes a plurality of channel extension bars horizontally movable with respect to said vehicle and each having one of said light-sensing devices mounted on the upper side thereof.

3. An illumination plotter apparatus as defined in claim 1 wherein said signal-responsive means comprises:
   amplifier means connected to each of said light-sensing devices;
   recorder means connected and responsive to said amplifier means; and
   at least one chart cooperating with said recorder means to portray indicia scribed thereon by said recorder means.

4. An illumination plotter apparatus as defined in claim 1 wherein said supporting means comprises:
   a pair of legs secured to said vehicle on the opposite sides thereof;
   an elongated, hollow top carrier adjustably connected to said legs and extending across the top of said mobile vehicle; and
   means slidably mounted on said top carrier and supporting said light-sensing devices for adjusting the horizontal spacing of said light-sensing devices.

5. An illumination plotter apparatus as defined in claim 1 wherein said light-sensing devices are cadmium sulfide photoresistor devices having a convex cadmium sulfide light-sensitive surface with the convexity of the surface facing upwardly.

6. An illumination plotter apparatus as defined in claim 1 wherein said mobile vehicle is an automatic vehicle having a rain rail on the sides of the vehicle adjacent the top thereof, and wherein said supporting means comprises:
   a pair of legs engaging said rain rail on the opposite sides of the vehicle and projecting upwardly therefrom; and
   an elongated top carrier having its opposite ends secured to said legs.

7. An illumination plotter apparatus as defined in claim 2 wherein said supporting means is further characterized in including a top carrier mounted on, and extending transversely across, said mobile vehicle and slidably supporting said channel extension bars in aligned, end-to-end relation.

8. An illumination plotter apparatus as defined in claim 7 wherein at least one of said light-sensing devices is mounted on each of said channel extension bars adjacent its end located most remotely with respect to the other of said channel extension bar, and includes an upwardly facing, convexly configured surface of light-sensitive material.

9. An illumination plotter apparatus as defined in claim 8 wherein said signal-responsive means comprises:
   an amplifier having a number of channels corresponding to the number of said light-sensing devices;
   signal-conveying electrical leads connecting the light-sensing devices with said amplifier;
   recorder devices corresponding in number to the number of said amplifier channels each connected to said amplifier; and
   chart means positioned adjacent said recorder devices for receiving traces scribed by said recorder devices.

10. An illumination plotter apparatus as defined in claim 9 wherein said vehicle is an automobile and said amplifier, recorder devices and chart means are positioned on the inside thereof.